(12) United States Patent
Schröder et al.

(10) Patent No.: US 9,721,073 B2
(45) Date of Patent: *Aug. 1, 2017

(54) METHOD AND LICENSING SYSTEM FOR AUTOMATICALLY LICENSING SERVICE FEATURES DURING THE UPGRADE OF A COMMUNICATION SYSTEM

(71) Applicant: Unify GmbH & Co. KG, Munich (DE)

(72) Inventors: Simone Schröder, Dortmund (DE); Harald J. Zainzinger, Vienna (AT); Christos Kontogiannis, Volos (GR)

(73) Assignee: Unify GmbH & Co. KG, Munich (DE)

( * ) Notice: Subject to any disclaimer, the term of this patent is extended or adjusted under 35 U.S.C. 154(b) by 70 days.

This patent is subject to a terminal disclaimer.

(21) Appl. No.: 14/815,235

(22) Filed: Jul. 31, 2015

(65) Prior Publication Data
US 2015/0339462 A1 Nov. 26, 2015

Related U.S. Application Data

(63) Continuation of application No. 14/382,192, filed as application No. PCT/EP2012/000956 on Mar. 2, 2012, now Pat. No. 9,129,096.

(51) Int. Cl.
*G06F 9/44* (2006.01)
*G06F 21/10* (2013.01)
(Continued)

(52) U.S. Cl.
CPC .............. *G06F 21/105* (2013.01); *G06F 8/65* (2013.01); *G06Q 10/10* (2013.01); *G06F 2221/0746* (2013.01)

(58) Field of Classification Search
CPC . G06F 21/105; G06F 8/65; G06F 8/61; G06F 2221/0746; G06Q 10/10
(Continued)

(56) References Cited

U.S. PATENT DOCUMENTS 7,747,851 B1 6/2010 Robinson et al.
2006/0179002 A1 8/2006 Brooks et al.
(Continued)

FOREIGN PATENT DOCUMENTS

CN 101060441 A 10/2007
CN 101170446 A 4/2008
(Continued)

OTHER PUBLICATIONS

International Preliminary Report on Patentability for PCT/EP2012/000956 dated Sep. 12, 2014 (Form PCT/ISA/373) (English Translation).
(Continued)

*Primary Examiner* — Anna Deng
(74) *Attorney, Agent, or Firm* — Buchanan Ingersoll & Rooney PC

(57) ABSTRACT

The invention relates to a method for automatically licensing service features during the upgrade of a first communication system (11) into a second communication system (12), said method having the following steps: (a) extracting the service features to be licensed from a database, (b) transmitting the service features to be licensed to a License Server (CLS), (c) generating a license file (LF) in the License server (CLS), (d) transmitting the license file (LF) to the second communication system (12), and (e) installing the license file (LF) in the second communication system (12). This invention also relates to a corresponding computer program and corresponding licensing system.

13 Claims, 2 Drawing Sheets

(51) Int. Cl.
*G06Q 10/10* (2012.01)
*G06F 9/445* (2006.01)

(58) Field of Classification Search
USPC .......................................................... 717/172
See application file for complete search history.

(56) References Cited

U.S. PATENT DOCUMENTS

| 2008/0052295 | A1* | 2/2008 | Walker | G06F 21/10 |
| 2010/0257567 | A1* | 10/2010 | Jupin | G06Q 30/02 |
| | | | | 725/68 |
| 2012/0011244 | A1 | 1/2012 | Zhu | |
| 2012/0204269 | A1* | 8/2012 | Gardner | G06F 21/10 |
| | | | | 726/26 |
| 2013/0185173 | A1 | 7/2013 | Zheng et al. | |

FOREIGN PATENT DOCUMENTS

| CN | 101753337 A | 6/2010 |
| EP | 1414194 A1 | 4/2004 |
| EP | 2306310 A1 | 4/2011 |
| WO | 2004042613 A1 | 5/2004 |
| WO | 2006066789 A2 | 6/2006 |

OTHER PUBLICATIONS

International Preliminary Report on Patentability for PCT/EP2012/000956 dated Sep. 12, 2014 (Form PCT/ISA/373) (German Translation).
Written Opinion of the International Search Authority for PCT/2012/000956 dated Jul. 9, 2012 (Form PCT/ISA/237).
International Search Report for PCT/2012/000956 dated Jul. 9, 2012 (Forms PCT/ISA/220, PCT/ISA/210).).

* cited by examiner

METHOD AND LICENSING SYSTEM FOR AUTOMATICALLY LICENSING SERVICE FEATURES DURING THE UPGRADE OF A COMMUNICATION SYSTEM

CROSS REFERENCE TO RELATED APPLICATIONS

This application is a continuation application of U.S. patent application Ser. No. 14/382,192, which is the United States national phase under 35 U.S.C. §371 of PCT international application no. PCT/EP2012/000956, filed on Mar. 2, 2012.

BACKGROUND OF THE INVENTION

Field of the Invention

Embodiments relate to methods for automatically licensing features during the upgrade of a first communication system to a second communication system, a computer program and a licensing system to perform such method.

Background of the Related Art

Modern communication systems such as telephone systems for small, medium and large enterprises are configurable and scalable in many ways, for example using CTI (Computer Telephony Integration) and CSTA (Computer Supported Telecommunications Applications). Mostly, the determined features are activated by means of a file containing licensing data.

A change in the scope of features to be licensed is often associated to the upgrade of such a system. The reasons for this can be legal reasons (for example, required royalty payments to licensors), economic reasons (for example, if customers are to pay for a feature in a new version) or technical reasons (for example in old versions, as many TDM as available ports could connected while for a new system, a license is required for each TDM device). TDM stands for Time Domain Multiplex and refers to a telecommunication device which uses a time multiplex procedure as for example in "conventional" devices such as wireless phones, but not as in IP phones.

According to internal company procedures, the upgrade of telecommunication systems may typically be carried out manually according to the following procedure:

1. A special user (who in many cases is a product manager or PM) acquires a quantity of licenses also known as PM-licenses for new systems using standard procurement procedures. Different scenarios for "New Systems" are possible: It can be the hardware of a legacy system on which new software or new software features are updated or upgraded. It can be as well the use of new hardware which can operate new software with newly licensed features.

2. As a further step of the ordering procedure the license fees are paid.

3. After the ordering process is completed, the licenses become available on the PM's account.

4. Whenever a customer wants to upgrade an old system, he sends to the PM a proof of the presence of the features on the old system. This proof can be provided in the form of screenshots, a delivery slip for the TDM devices or the like.

5. The PM sends the new licenses manually to the customer's account.

6. This customer will then activate the new licenses.

The procedure described above has a number of disadvantages:

1. The PM must in each case estimate in advance how many are needed.

2. The royalty payment is made before the actual use or activation of the licenses, which is sooner than required.

3. Generally, the licenses are not immediately available, since the ordering process takes some time.

4. The required evidence is not safe and there is room for abuse.

5. It can be impossible or very difficult to ensure that new licenses are not enabled on systems that have not been upgraded. In other words, it is difficult to prevent that such licenses are used to upgrade an existing communication system on which no "old" license or software was installed and to configure and activate it as functional system.

Another fundamental problem is that the upgrade is a manual process requiring a significant effort and thus generating significant training and implementation costs as well as costs to correct errors and avoid errors.

BRIEF SUMMARY OF THE INVENTION

We provide a method for automatically licensing features during the upgrade of a first communication system to a second communication, a corresponding computer program, and a corresponding licensing system.

According to an embodiment of the invention a computer aided and computer-based method for automatically licensing features during the upgrade of a first communication system to a second communication system (where the first communication system does not necessarily have to be different from the second one in terms of hardware or software) includes the following steps: first, the features that need to be licensed are extracted from a database. This database can be built, for example, from existing features in the first communication system. Then, the features which have to be licensed are transmitted to a license server and a license file is created, which is then transmitted to the second communication system and is installed there also.

DETAILED DESCRIPTION OF THE INVENTION

Figure 1:
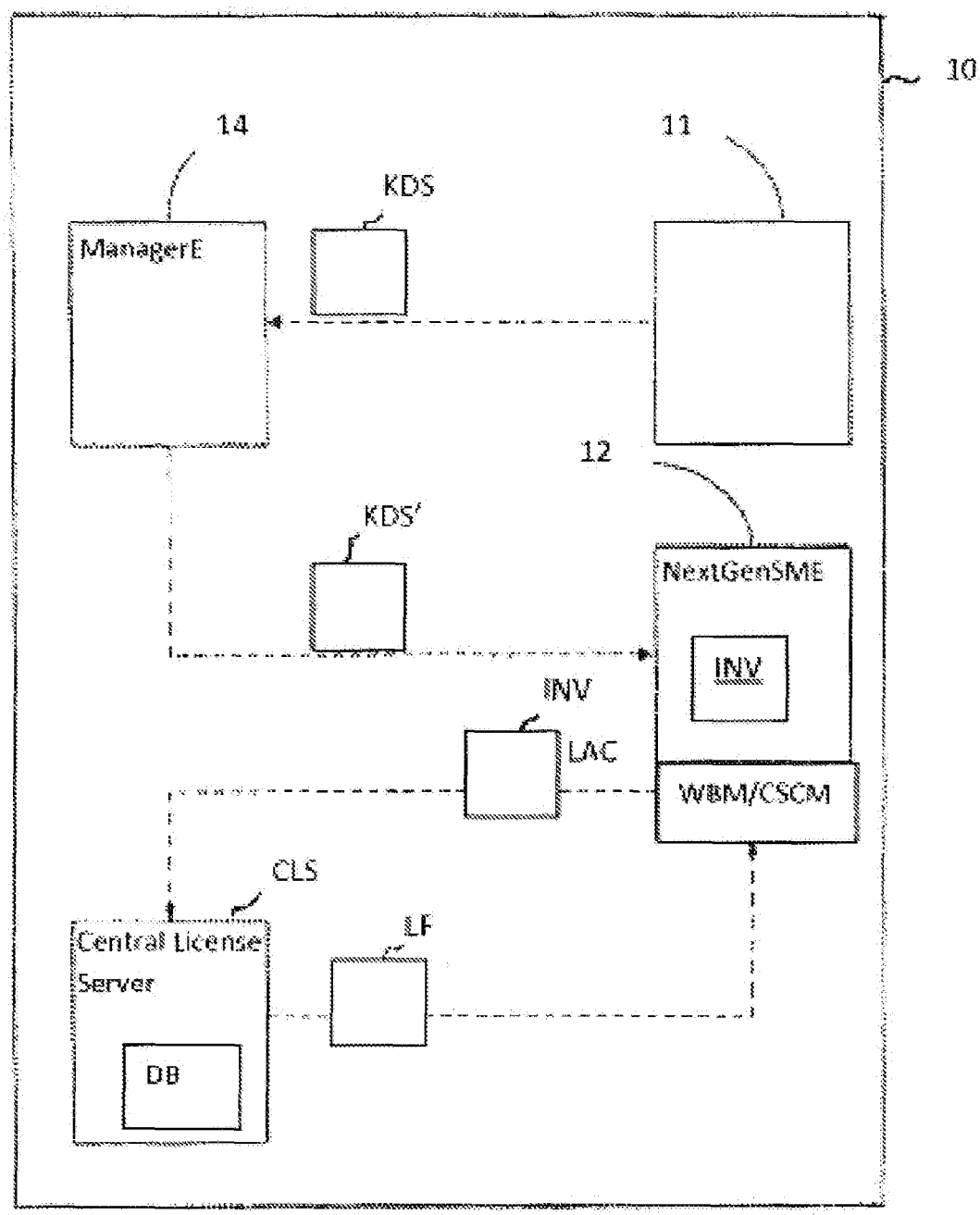
FIG. 1 shows schematically the components of a license system according to man exemplary embodiment of the invention and FIG. 2 illustrates a flow chart of an exemplary embodiment of a method for automatically licensing service features during the upgrade of a first communication system to a second communication system.

The method according to the invention replaces the usual manual workflow with an automated procedure. The method can be executed in a simple and cost-effective manner, and it eliminates the need for licenses that are used later to be purchased and paid for in advance. By extracting the features to be upgraded from existing databases and by transferring them to the license server, a simple and automated procedure is ensured.

According to an advantageous embodiment of the method, the step of extracting the features to be licensed from the database comprises a step of reading the features of the first communication system and depositing the data in a customer data memory. Thus, these data and features can be transferred as a compact unit, which can for example be done in binary format by means of an appropriate software tool.

It is advantageous to convert the content of the customer's data memory and to expand it with further information, such as, for example, as given by means of the MAC address. Furthermore, it is advantageous if the step of transmitting the features that need to be licensed to the license serve comprises a step of transmitting the converted content of the customer data memory to the second communication system, and in addition a step of generating and transmitting an inventory file to the license server. All the customer data (at least the essential customer data) are included as an "Inventory" for example in this inventory file. The security of the transmission and the protection against fraud can be substantially increased if the inventory file is cryptographically signed.

A particularly simple and safe process implementation is possible because a License Authorization Code is entered on the license server. This license authorization code specifies and determines the licensed features, and also which features need to be upgraded. The License Authorization Code can be used for an order to upgrade a version or to acquire additional licenses.

It may be advantageous if the license server could check first whether or not the first communication system is upgraded. So it can be prevented that an old system without any license would be upgraded through an upgrade license.

Furthermore, it may be advantageous that the license server runs a verification step to prevent another upgrade of a second communication system. This means that for example, when replacing old hardware with new hardware, systems cannot be upgraded via the license server. To this end, a lock table is created, and by doing so, the MAC address of the old hardware, that has to be retired and replaced with new hardware, is captured which prevents the upgrade of the old hardware with an upgrade license. This greatly reduces possible fraud.

Embodiments may also provide a computer program or computer program product according to claim 9 for carrying out any of the methods described above. The advantages and characteristics associated to the methods previously described are similarly applicable to the computer program, an therefore no separate description is provided.

Embodiments may also provide a licensing system. Such a licensing system includes a first communication system, a second communication system (which must not necessarily be different from the first communication system in terms of hardware and/or software), as well as a license server. The advantages and characteristics of the licensing system according to the invention are similar to those previously described with regard to the methods and are therefore not described again.

As already mentioned, no upfront licenses a required by the method and the computer program and licensing system according to the invention, which is why the royalty payment to the licensor does not take place until the date on which the licenses are needed. It is also possible that an upgrade may optionally be carried out without ordering licenses, provided this is allowed by the system. This would be the case, for example, that when switching to new hardware, the new or additional licenses will be provided free of charge.

It should also be noted that all transactions are documented and can be easily understood. The inventory file includes all previous features (excluding the upgrade newly added features.)

According to the invention it is thus possible to prevent in a simple way that new licenses are activated on systems that were not upgraded since proof of the presence on the old systems must first be provided.

Figure 2:
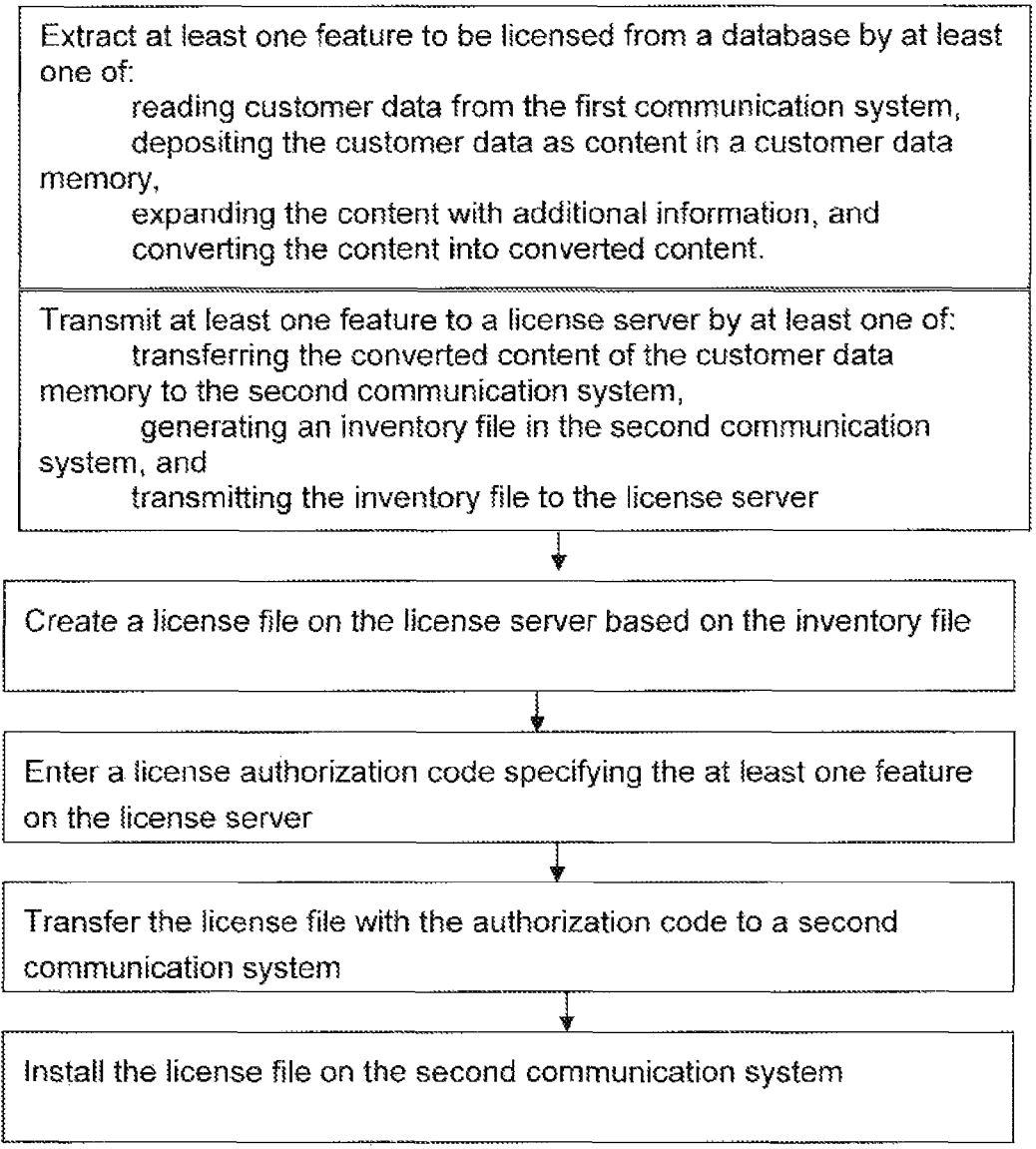

Further advantages, features and characteristics of this invention will become apparent from the following description of an advantageous embodiment of both the method and the licensing system that can be appreciated from FIGS. 1 and 2.

The license system 10 comprises a first communication system 11 and a second communication system 12 that are shown. The first communication system 11 is an old system and the second communication system 12 is a new one which includes hardware changes. As already stated, the two communication systems 11, 12 can be the same and only differ in software and/or licenses.

A telecommunication system called OSO MX V3 by Siemens Enterprise Communications is used as an example for the first communication system 11, while the next generation communication system called Next-GenSME is used as an example for the second communication system 12. An application 14 for the administration of customer data ("ManagerE"), reads the customer data on the first communication system 11 and stores it in so-called customer data memory KDS. This KDS customer data memory is then transferred as a binary file to the ManagerE. Here a stored the number of the features that have not been licensed on the first communication system 11, but that are defined by means of other features (e.g. a proper hardware system). In this example it is the number of physically installed TDM devices or TDM users. This feature previously available for free should be considered as part of the version upgrade since it needs to be licensed on the new version of the product (NextGenSME, for example).

The number of features that must be upgraded (e.g. TDM users) is determined from the customer data memory by using a KDS-conversion. Here, the customer data include additional information (in particular the MAC address of the system they belong to.)

The converted content KDS' of the customer data memory KDS is transferred to the second communication device 12. A so-called inventory INV file is generated in the second communication system 12 and cryptographically signed.

The Inventory file INV is transferred to the license server (also called Central License Server) CLS using the WBM/CSCM interface for online licensing via the Internet. WBM stands for Web-Based Management, which is used for the administration of a communication system 11 or 12 on a web server with an interface to a browser. CSCm stands for Customer Site Components modular, which is an interface between the WBM and the license server and is used to establish a connection to the license server for the online licensing procedure. A license file LF is downloaded from the license server CLS and the content of the loaded license is displayed in the WBM. In addition, a license authorization code LAC is entered via the WBM. A license order for a version upgrade and optionally for additional licenses is issued. To ensure that the inventory file was not tampered with, the license server CLS can verify the signature and also ensure by means of the MAC address in the transferred Inventory File and of a revocation list created in a database DB that the original system has not been upgraded yet. The presence (payment) of the available licenses required for the planned upgrade can be checked by means of the transmitted License Authorization Codes LAC. The license server CLS generates the license file LF for the second communication system 12 taking into account the data in the inventory file, as well as the purchased licenses that are referenced via the License Authorization Code LAC. To avoid a further activation of the Inventory INV files on another system or in another communication system, the license server CLS records the MAC address from the inventory file in the revocation list. In case of an attempt to upgrade a communication system whose corresponding MAC address is listed in the revocation list, an error message appears, and the licensing process is canceled. This greatly enhances the security and protects against fraudulent licensing.

The generated license file LF (also called license data) will be sent via the Internet interface to the second communication system 12 where it is installed. Subsequently, the second communication system 12 can be used with all the upgraded features.

It should be noted that the described features of the invention with reference to the illustrated embodiment of the invention, such as sequence and exact execution of the individual method steps and the software and hardware components used, may be present in other embodiments and, except when otherwise indicated or prohibited for technical reasons.

The invention claimed is:

1. A method for automatically activating service features for a communication system comprising:
   expanding data deposited in non-transitory memory relating to the features of a first communication system, wherein the data deposited in non-transitory memory including at least one media access control (MAC) address of the first communication system;
   converting the expanded data to identify features that need to be upgraded and transferring the converted expanded data to a second communication system for generation of an inventory file, wherein the inventory file is cryptographically signed via a cryptographic signature;
   sending the inventory file to a license server;
   accessing a first license file from the license server and entering a license authorization code for the first license file to facilitate creating a second license file on the license server for the second communication system based on the inventory file and the license authorization code, wherein the license server verifying the cryptographic signature to ensure the first license file was not tampered with prior to creating the second license file for the second communication system, and the license authorization code identifies the features need to be uprated and at least one additional license that is needed;
   verifying the first communication system was not already upgraded via the MAC address prior to transferring the second license file created for the second communication system to the second communication system; wherein the MAC address is identifiable from the inventory file; and
   receiving, by the second communication system, the second license file created for the second communication system from the license server such that the second license file created for the second communication system is installable on the second communication system.

2. The method of claim 1, comprising:
   reading customer data from the first communication system, and depositing the read customer data as content in the non-transitory memory that relates to features of the first communication system.

3. The method of claim 1, comprising:
   the license server recording a media access control ("MAC") address identified via the inventory file in a revocation list; and
   verifying, by the license server, that a third communication system has not yet been upgraded via the MAC address recorded in the revocation list.

4. The method of claim 1, comprising:
   preventing, by the license server, an upgrade of a third communication system when the third communication system has a media access control ("MAC") address listed on a revocation list, the MAC address listed on the revocation list identifying a MAC address from an inventory file for a communication system that has already been upgraded by use of the inventory file.

5. A licensing system including at least one processor and at least one memory for automatically licensing service features during an upgrade of a first communication system to a second communication system, the memory storing instructions executable by the at least one processor to perform:
   creating a license file for the second communication system based on receipt of an inventory file from the second communication system and a license authorization code that specifies at least one of: (a) at least one feature that needs upgraded and (b) at least one additional license that is needed, wherein the inventory file is formed based on converted data from a first communication system that identified features that needed to be upgraded, and the inventory file identifies at least one media access control (MAC) address of the first communication system; and
   transferring said license file created for the second communication system to the second communication system such that the license file created for the second communication system is installable on the second communication system, wherein the licensing system identifying the MAC address from the inventory file, and verifying that the first communication system was not already upgraded via the MAC address prior to transferring the license file created for the second communication system to the second communication system.

6. The licensing system of claim 5, wherein the instructions executable by the at least one processor are configured so that the licensing system also performs:
   assessing a cryptographic signature of the inventory file.

7. A licensing system including at least one processor and at least one non-transitory memory for automatically licensing service features during an upgrade of a first communication system to form a second communication system, the memory storing instructions that are executable by the at least one processor such that the licensing system is configured to perform a method comprising:
   receiving a first inventory file from the second communication system, the first inventory file based on converted content of customer data stored in the first communication system and identifying at least one media access control ("MAC") address of the first communication system and features of the first communication system;
   providing access to a first license file associated with the first communication system;
   receiving a license authorization code that specifies at least one of (a) at least one feature that needs upgraded and (b) at least one additional license that is needed for the second communication system;

generating a second license file based on the received first inventory file and the received license authorization code;

transmitting the generated second license file to the second communication system that is installable on the second communication system;

recording a first Media Access Control (MAC) address from the first inventory file into a revocation list so that the revocation list identifies the first MAC address;

receiving a second inventory file having a second MAC address; and checking the revocation list such that:
- upon a determination that the second MAC address matches the first MAC address identified on the revocation list, cancelling upgrading of the first communication system that sent the second inventory file; and
- upon a determination that the second MAC address does not match any MAC address identified on the revocation list, allowing upgrading of the first communication system that sent the second inventory file to proceed.

8. The licensing system of claim 7, wherein the at least one MAC address is comprised of a MAC address of hardware that is to be retired and replaced with new hardware and the license authorization code identifies features that are to be upgraded for the second communication system.

9. The licensing system of claim 7, wherein the canceling of the upgrading of the first communication system that sent the second inventory file comprises communicating an error message to the first communication system.

10. The licensing system of claim 7, wherein the converted content of customer data comprises a number of time domain multiplex devices.

11. The licensing system of claim 7, wherein the first inventory file is cryptographically signed.

12. The licensing system of claim 7, wherein the converted content of customer data comprises information relating to a number of time domain multiplex devices and a MAC address of the first communication system.

13. The licensing system of claim 7, wherein the licensing system is configured as a central license server.

* * * * *